J. HORWATH

Aug. 18, 1931. DISPLAY STAND AND THE LIKE Re. 18,153

Original Filed May 14. 1928 2 Sheets-Sheet 1

Inventor
Julius Horwath
by Thos. A. Lamb Jr.
Atty.

J. HORWATH

Aug. 18, 1931 DISPLAY STAND AND THE LIKE Re. 18,153

Original Filed May 14, 1928 2 Sheets-Sheet 2

Inventor
Julius Horwath
by Thos. A. Deming Jr.
Atty.

UNITED STATES PATENT OFFICE

JULIUS HORWATH, OF CHICAGO, ILLINOIS, ASSIGNOR TO ARVEY CORPORATION, OF CHICAGO, ILLINOIS, A CORPORATION OF ILLINOIS

DISPLAY STAND AND THE LIKE

Original No. 1,713,758, dated May 21, 1929, Serial No. 277,586, filed May 14, 1928. Application for reissue filed May 20, 1931. Serial No. 538,862.

The present invention has to do with an improved construction of the display stand for display and advertising purposes. The stand of the present invention is especially intended for placing on counters, show cases, window cabinets, and other similar places.

One object of the invention is to provide a display stand of improved construction which can be made up from a single piece of card board or similar material cut into a blank of the proper shape and then folded in the proper manner to establish the form of the stand. A further object in this connection is to provide a display stand which is entirely self-supporting when folded into the above form, and which entirely eliminates the necessity of using an easel or other special support.

A further object of the invention is to provide a display stand of such arrangement that it can be folded up into a very thin self-contained package, the thickness whereof is only equal to that of four thicknesses of the material from which the article is made.

A further object of the invention is to provide a display stand of such arrangement that there is provided a pocket or compartment to receive one of the packages or articles to which the display of the stand relates. It is a further object in this connection to provide a display stand of very unique and attractive appearance and having high merit and advertising value.

Other objects and uses of the invention will appear from a detailed description of the same which consists in the features of construction and combinations of parts hereinafter described and claimed.

In the drawings: Fig. 1 shows a perspective view of a stand embodying the features of the present invention, the same being opened out into the working position, and a display carton being set in place in the opening provided for that purpose;

Figure 1:
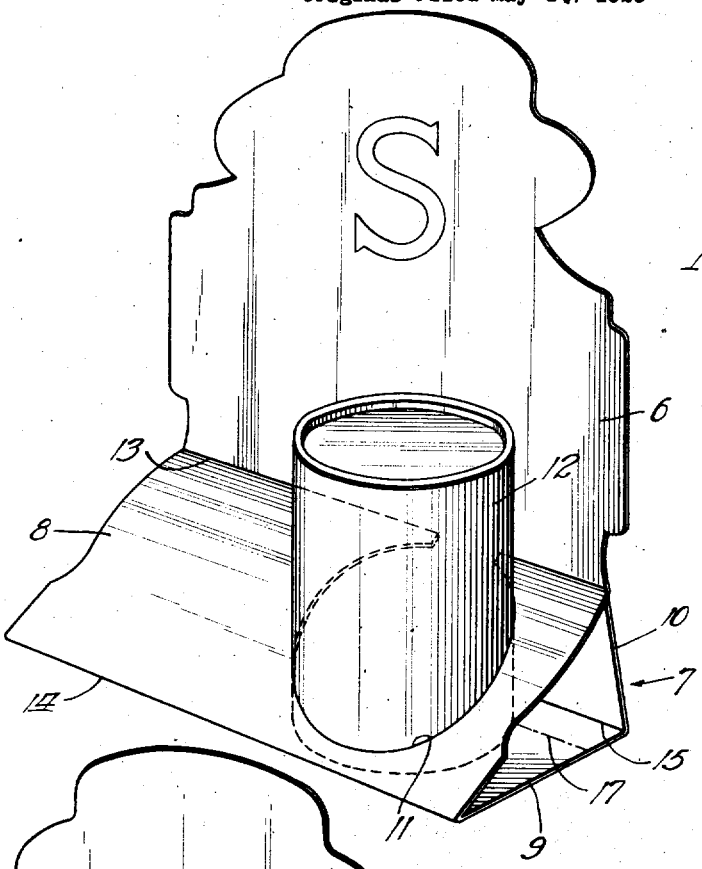

The stand herein illustrated includes a body portion 6 together with a base portion 7 which supports said body portion. The base portion 7 is of triangular cross section having the downwardly slanting display portion 8, the bottom portion 9, and the vertical back portion 10. When the device is in service the back portion 10 stands vertical and substantially in line with the body portion 6, being offset therefrom by an amount equal only to the thickness of the material.

The downwardly slanting display portion 8 is provided with an elongated or elliptical hole 11 of such form that the horizontal projection thereof is substantially circular. This hole 11 serves to receive the can or package 12 of the article which is being displayed, said can reaching down through the hole and resting upon the bottom portion 9. The weight of this article so displayed thus is imposed directly upon the bottom portion 9 and serves additionally to prevent the display stand from being knocked over backwards.

Figure 3:
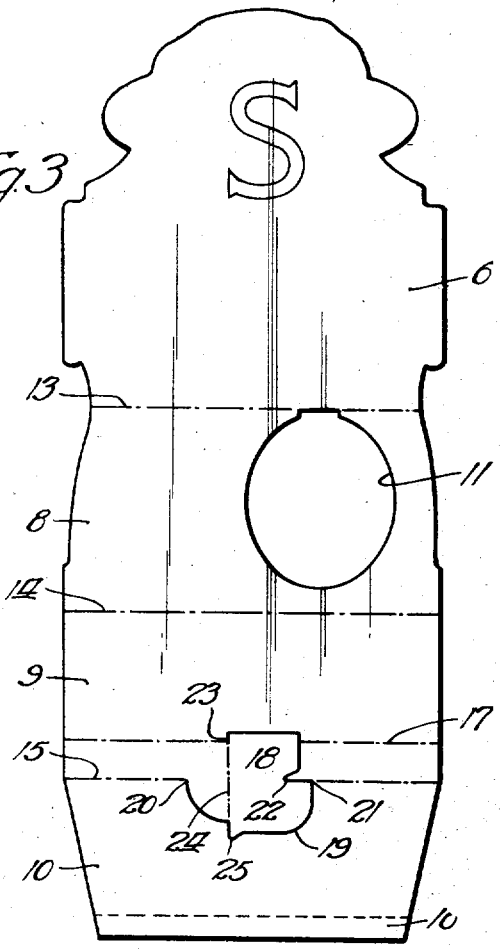
Fig. 3 shows a face view or development of the blank for the stand of Figs. 1 and 2.
Figure 4:
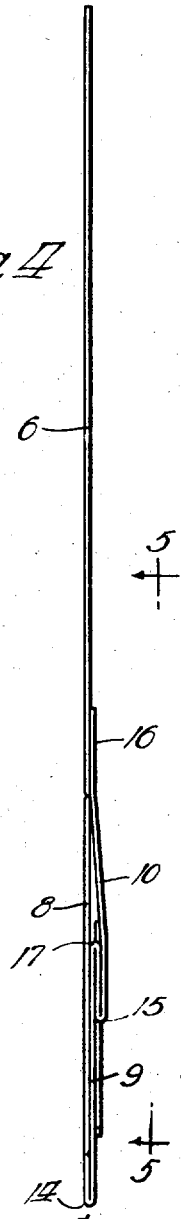
Fig. 4 shows a longitudinal section through a display stand embodying the features of the present invention, the same being folded up into the flat or shipping form, Fig. 4 being on enlarged scale.
Figure 5:
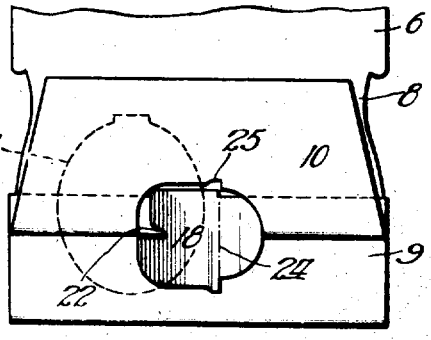
Fig. 5 shows a face view of the lower portion of the article folded up as in Fig. 4, but on smaller scale than Fig. 4.

The entire stand is preferably made from a single blank cut out into the general form illustrated in the development of Fig. 3. From this it is seen that the downwardly slanting display portion 8 is folded forwardly from the body portion 6 along the fold line 13; that the bottom portion 9 is folded rearwardly from the display portion 8 along the fold line 14; and that the upwardly extending back portion 10 is folded upwardly from the bottom portion 9 along the fold line 15. The upper edge 16 of the back portion 10 is then glued or cemented to the back of the body portion 6 immediately above the fold line 13. In case the display portion 8 is of less length than the combined lengths of the bottom and back portions 9 and 10 (which is usually the case due to the triangular form of the base portion 7) another fold line 17 may be provided across the bottom portion 9 so that by folding on the same the entire structure of the base 7 can be infolded into the form shown in Fig. 4 so as to bring the same into a thickness only equal to the thickness of four layers of material. In shipping the articles they may be made up into a solid package by setting them with their base portions alternately at one side and then the other side of the package, thus bringing the body portion 6 of one article against the base portion 7 of the next one, etc.

In order to lock the base portion 7 in the working position, and also to establish additional support for the stand measured in a horizontal direction, I have provided the locking lug 18. The same is located across the fold line 15 and is cut out along the cutting line 19 in the general form shown in Fig. 3. This cutting line commences at the point 20 on the fold line 15 and advances towards one end of the blank and then across the blank and back to the fold line 15 at the point 21. The cutting line 19 then reenters into the lug 18 at the point 22 substantially in line with the fold line 15, then advances towards the other end of the blank and then across the blank and terminates at the point 23 which is offset from the commencement point 21. There is then provided the fold line 24 extending longitudinally of the lug 18 through the point 23 so that the lug itself can be turned up at right angles on said fold line as shown at Fig. 2.

Figure 2:
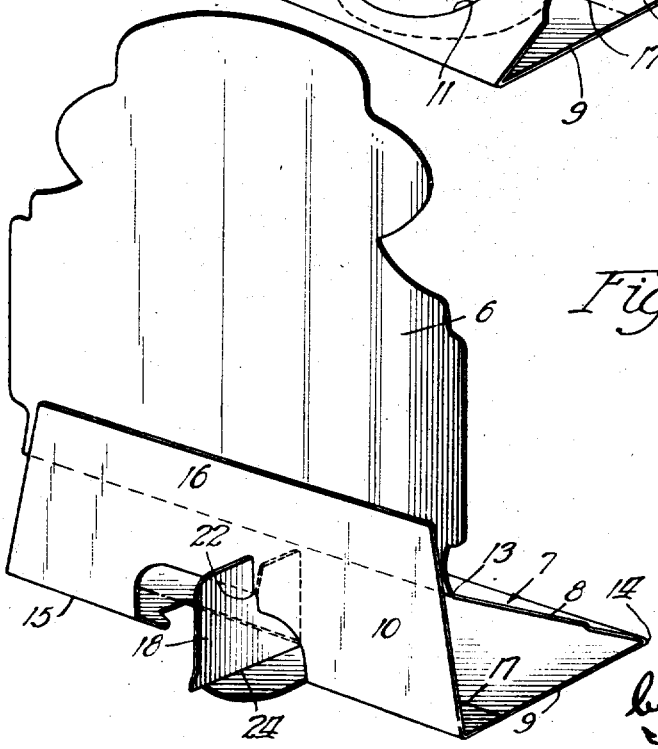
Fig. 2 shows a back view corresponding to Fig. 1.

The reentrant notch 22 engages a similar notch 25 in the cutting line 19 when the lug is turned up into the working position of Fig. 2 and thus retains the lug in said position.

It will be noted that due to the triangular base member, and the fact that the rear portion thereof reaches up substantially vertically, it is possible to place the can or other article being displayed down through the opening of the front portion of the base member so that said article will rest on the bottom portion and thus give the entire structure additional support and stability.

While I have herein shown and described only a single embodiment of my present invention still I do not wish to limit myself thereto except as I may do so in the claims.

I claim:

1. As a new article of manufacture a display stand for the purpose specified comprising a single sheet of card board or the like adapted to be folded in continuous fashion to establish a vertical display section, a downwardly and forwardly slanting fold section, a bottom section, and an upwardly extending vertical rear section, means for securing the upper edge of the last named section to the lower portion of the back face of the display section, there being fold lines at the lines of junction of said sections with each other, the fold section, bottom section and back section together constituting a substantially right-angled triangle when folded into working position, means for retaining said parts in such position comprising a locking lug cut out from the body of the material of the bottom and back sections at both sides of the line of joinder between them, said lug being attached thereto by a fold line extending at right angles to said line of joinder, there being a notch in the upper edge of said lug in position to engage the back section when the lug is raised into working position, and there being an opening in the front section for the accommodation of a carton to be displayed, and to permit said carton to rest on the bottom section and give the same added stability, substantially as described.

2. As a new article of manufacture a display stand for the purpose specified comprising a single sheet of card board or the like adapted to be folded in continuous fashion to establish a vertical display section, a downwardly and forwardly slanting front section, a bottom section, and an upwardly extending vertical rear section, means for securing the upper edge of the last named section of the lower portion of the back free of the display section, there being fold lines at the lines of junction of said sections with each other, the fold section, bottom section and back section together constituting a substantially right-angled triangle when folded into working position, means for retaining said parts in such position comprising a locking lug cut out from the body of the material of the bottom and back sections at both sides of the line of joinder between them, said lug being attached thereto by a fold line extending at right angles to said line of joinder, there being a notch in the upper edge of said lug in position to engage the back section when the lug is raised into working position, substantially as described.

3. In combination, a foldable display device comprising a main display panel, a base for said panel disposed in a substantially horizontal plane, a member connected to said base, said member being substantially at right angles to said base when said device is in display position, and means for maintaining said device in display position comprising a tongue foldably connected to said base and provided with a notch for engaging an edge of a wall defining an aperture provided in said member adjacent its connection to the base when said tongue is folded into a position at an angle to said base.

4. In combination, a foldable display device comprising a main display panel, a base for said panel disposed in a substantially horizontal plane, a member connected to said base, said member being substantially at right angles to said base when said device is in display position, means for maintaining said device in display position comprising a locking lug cut out from the body of the material of the base and right angle member at both sides of the line of joinder between them, said lug being attached thereto by a fold line extending at substantially right angles to said line of joinder, there being a notch in the upper edge of said lug in position to engage said right angle member when the lug is raised into working position.

5. As a new article of manufacture a display stand for the purpose specified comprising a single sheet of card board or the like adapted to be folded in continuous fashion to establish a vertical display section, a downwardly and forwardly slanting front section, a bottom section, and an upwardly extending vertical rear section, means for securing the upper edge of the last named section to the lower portion of the back face of the display section, there being fold lines at the lines of junction of said sections with each other, the front section, bottom section and back section together constituting a substantially right angled triangle when folded into working position, means for retaining said parts in such position comprising a locking lug foldably connected to the base of the right angled triangle so formed, said lug being foldable at substantially right angles to the base, the upper portion of said lug engaging one side of said right angled triangle.

JULIUS HORWATH.